United States Patent [19]

Yanagida

[11] 4,384,308

[45] May 17, 1983

[54] APPARATUS FOR RECORDING AND DETECTING A CUE SIGNAL

[75] Inventor: Tuneo Yanagida, Hino, Japan

[73] Assignee: Olympus Optical Co., Ltd., Tokyo, Japan

[21] Appl. No.: 168,197

[22] Filed: Jul. 10, 1980

[30] Foreign Application Priority Data

Aug. 23, 1979 [JP] Japan .................. 54/107513

[51] Int. Cl.³ .................. G11B 5/00; G11B 5/02; G11B 15/18
[52] U.S. Cl. .................. 360/8; 360/27; 360/28; 360/72.2
[58] Field of Search .................. 360/27, 28, 72.2, 74.4, 360/8

[56] References Cited

U.S. PATENT DOCUMENTS

| | | | |
|---|---|---|---|
| 2,807,797 | 9/1957 | Shoemaker | 360/28 |
| 3,171,902 | 3/1965 | Jones et al. | 360/74.4 |
| 3,681,524 | 8/1972 | Nichols | 360/72.2 |
| 4,007,491 | 2/1977 | Bolick, Jr. et al. | 360/74 |
| 4,237,499 | 12/1980 | Tachi | 360/72.2 |

FOREIGN PATENT DOCUMENTS 53-28082 4/1978 Japan .

*Primary Examiner*—Vincent P. Canney
*Attorney, Agent, or Firm*—Frishauf, Holtz, Goodman & Woodward

[57] ABSTRACT

An apparatus for recording and detecting a cue signal which comprises:
 a recording section (100) for recording in a recording medium a composite cue signal formed of a component signal having a first frequency (f1) and denoting a tape speed pattern and another immediately following component signal having a second frequency (f2) and representing a cue signal pattern; and
 a detecting section (200), which, at the time of reproducing said composite cue signal, compensates a component signal which represents a cue signal pattern and is detected immediately after a tape speed pattern component signal drawn out of the recording medium in proportion to the period (T10) of said tape speed component signal, and when said composite cue signal is recorded in said recording medium, provides data on a cue signal pattern on the basis of the compensated component signal denoting a cue signal pattern.

29 Claims, 30 Drawing Figures a
  b2
  c
  d
  e
  f
  g
  h
  i
  j
  k
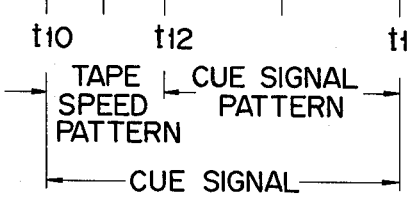

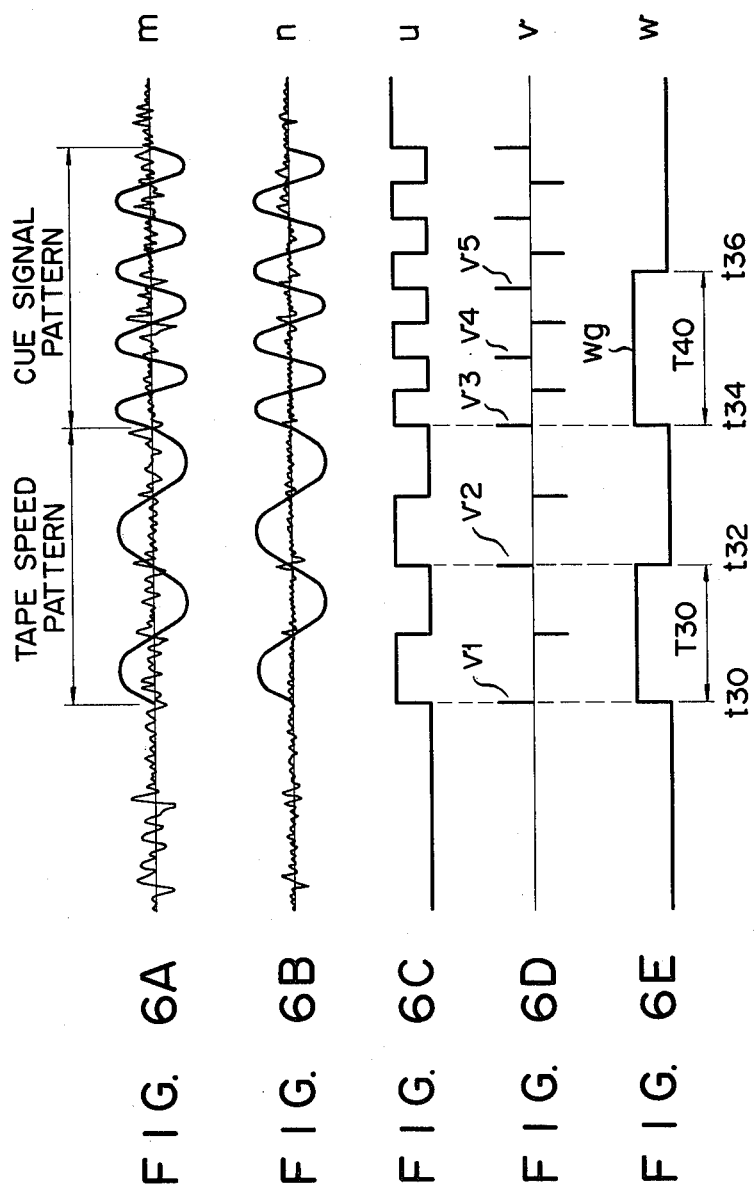

APPARATUS FOR RECORDING AND DETECTING A CUE SIGNAL

BACKGROUND OF THE INVENTION

This invention relates to an apparatus for recording and detecting a cue signal used in cueing the contents of a recorded data.

With a dictation apparatus or handy type tape recorder, for example, a cue signal is recorded as a rule on a recording tape in order to quickly detect the position of a particular recorded data. The following are the typical methods of recording a cue signal.

(1) A cue signal having such a low frequency (sine wave of less than 100 Hz) as lets the listener feel little concern at the time of playback is overlapped on a voice signal. United States patent application Ser. No. 138,195, filed Apr. 7, 1980, entitled "Cue Signal Recording Apparatus" (Inventor: Kenji Fujibayashi) and assigned to Olympus Optical Co., the same assignee as the present patent application may be cited as an embodiment of this process (1), though not constituting prior art with respect to the present patent application.

(2) A voice signal to be recorded is temporarily shut off. A cue signal of a specified form is recorded in that part of a tape in which a voice signal is not recorded.

(3) An exclusive cue signal track is formed in a tape. A cue signal of a specified form is recorded in this track. This arrangement is set forth in, for example, U.S. Pat. No. 4,007,491.

The method (3) ensures the relatively easy detection and subsequent processing of a cue signal and gives rise to few errors in detection. However, the requirement of an exclusive track decreases the width of tracks necessary for the recording of proper data, thereby reducing the efficiency of utilizing a tape. When, therefore, applied to a midget tape recorder such as a microcassette type, the method (3) is likely to raise problems such as deterioration of the S/N ratio and change in the signal level. In contrast, the methods (1) and (2) utilize voice-recording tracks for the impression of a cue signal without any loss in a tape-using efficiency. Since, however, the same track is applied to the recording of voice signals and cue signals, complication tends to arise in the detection of a cue signal and the subsequent processing thereof, and more errors are likely to occur in detection than in the method (3).

In the case of a midget tape recorder such as a microcassette type where the effective utilization of a tape bears a particularly great importance, the method (3) is unadapted for application. Therefore, the method (1) or (2) is still often accepted, though a somewhat complicated signal-processing circuit is involved. Problems resulting from the complication of a signal-processing circuit have come to be resolved by the development of integrated circuit techniques. Nevertheless, the method (1) or (2) is accompanied with the drawback that errors are apt to occur in the detection of a cue signal. Such errors mainly arise from the fact that the running speed of a tape is not accurately controlled when a cue signal is to be detected. At the time of normal recording-playback, a tape is made to travel by driving a capstan, thereby ensuring an accurate tape feed speed. Conversely where a cue signal is detected, the tape is made to run by driving a reel. Therefore, the running speed of the tape becomes unstable and noticeably varies with the progressively-increasing diameter of a roll of a taken up tape, presenting difficulties in accurately detecting a cue signal.

SUMMARY OF THE INVENTION

This invention has been accomplished in view of the above-mentioned circumstances and is intended to provide an apparatus for recording and detecting a cue signal capable of correctly distinguishing and detecting a recorded cue signal regardless of changes in the running speed of a tape.

To this end, an apparatus embodying this invention for recording and detecting a cue signal uses a composite cue signal formed of a tape speed signal denoted by f1 in FIG. 2 and a cue form signal represented by f2 in FIG. 2. By such composite cue signal, variations in current tape speeds or absolute values thereof can be detected from the aforesaid tape speed signal. The contents (N2 or T20 in FIG. 4) of the cue signal can be compensated on the basis of detected variations in tape speeds or absolute values thereof (N1 or T10 in FIG. 4). In other words, a recorded cue form signal can be correctly distinguished irrespective of the tape speed variations.

BRIEF DESCRIPTION OF THE DRAWINGS

FIGS. 6A–6E are waveform and timing diagrams showing the operation of the detecting section of FIG. 5.

DETAILED DESCRIPTION OF THE PREFERRED EMBODIMENTS

There will now be described the preferred embodiments of this invention with reference to the accompanying drawings. The same or similar parts are denoted by the same numerals, description thereof being omitted.

Figure 1:
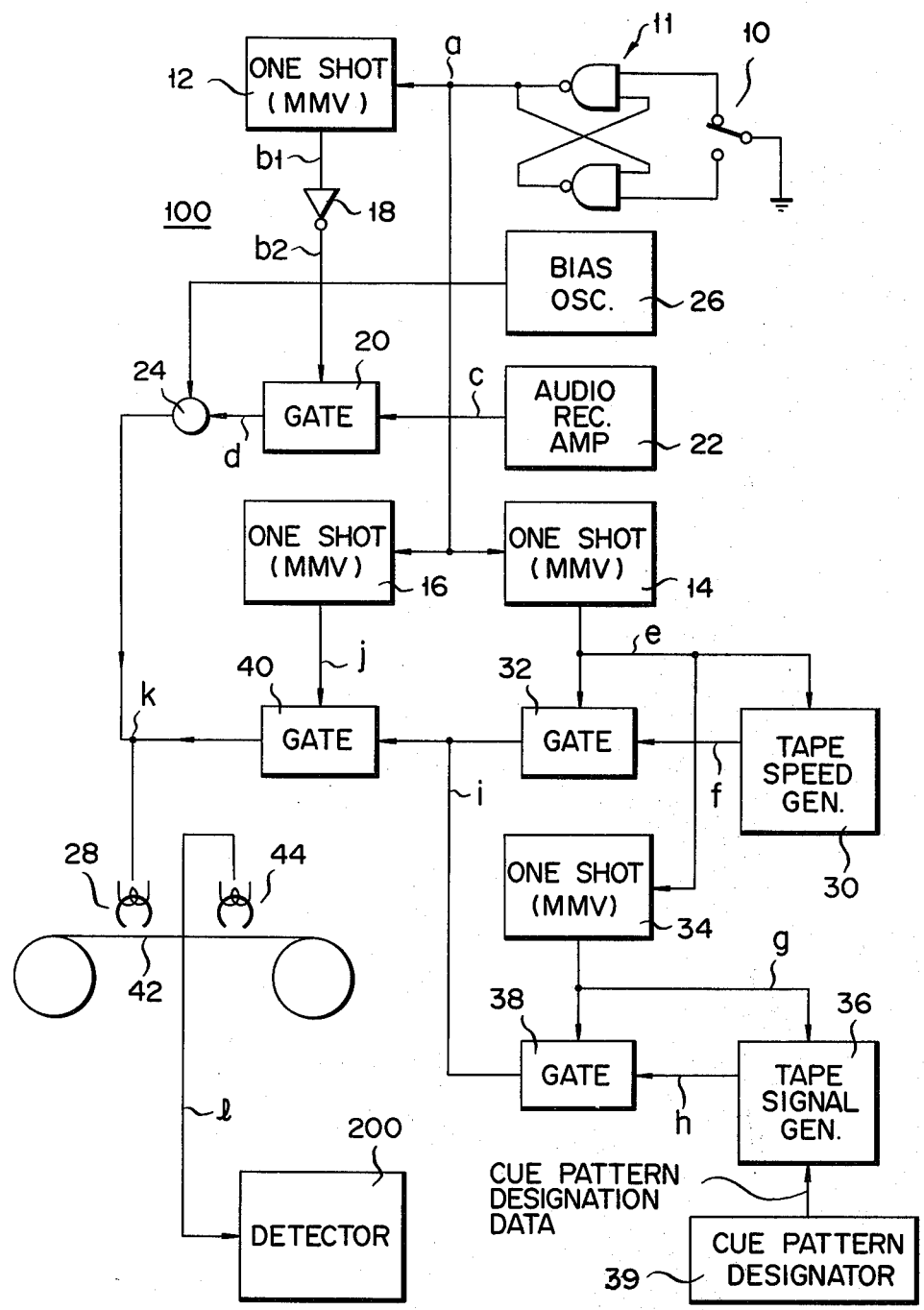
FIG. 1 is a block circuit diagram of a recording section of an apparatus embodying this invention for recording and detecting a cue signal.
Figure 2A:
FIGS. 2A–2K are waveform and timing diagrams showing the operation of the recording section of FIG. 1.
Figure 2B:

FIG. 1 shows the arrangement of a recording section 100 of an apparatus embodying this invention for recording and detecting a cue signal. FIGS. 2A–2K are waveform and timing diagrams showing the operation of the recording section of FIG. 1. A signal a of FIG. 2A is issued from a flip-flop circuit 11 at a time t10 when a cue signal-recording switch 10 is actuated. The signal a is supplied to one shot multivibrators (hereinafter abbreviated as "MMV") 12, 14, 16. The MMV 12 is triggered at the falling edge of the signal a, generating a gate signal b1 having a prescribed pulse width. This pulse width is represented by a time interval between t10 and t14. The level of the signal b1 (FIG. 1) is inverted by an inverter 18. As a result, the signal b1 is supplied to an analog gate 20 in the form of a signal b2 of FIG. 2B.

Figure 2C:
Figure 2D:

The analog gate 20 receives a voice signal c as shown in FIG. 2C from an audio recording amplifier 22. The analog gate 20 is opened when the signal b2 has a logic level "1" and closed when it has a logic level "0". The analog gate 20 is kept closed by the signal b2 having a logic level "0" for an interval from t10 to t14. Therefore, a voice signal d delivered from the analog gate 20 has its level reduced to zero for an interval from t10 to t14 as illustrated in FIG. 2D. The signal d is superposed in an adder 24 on a bias signal supplied from a bias oscillator 26. A voice signal on which the bias signal is superposed in the adder 24 is synthesized with the later described cue signal to provide a composite signal k to be recorded. This signal k is conducted to a recording head 28.

Figure 2E:
Figure 2F:
Figure 2G:
Figure 2H:

The MMV 14 is triggered at the falling edge of the signal a, sending forth a gate signal e of FIG. 2E having a prescribed pulse width. This gate signal e is carried to a tape speed signal generator 30, analog gate 32 and MMV 34. Where the gate signal e has a logic level "1", then a signal generator 30 sends forth a signal f having a first frequency f1 of FIG. 2F. The signal generator 30 may be a conventional CR oscillator. The first frequency f1 is given by a sine wave having a frequency of, for example, 50 Hz. The signal f is supplied to the analog gate 32, which is left open, while the signal e has a logic level "1", that is, for an interval from t10 to t12, allowing for the passage of the signal f. With this embodiment, the interval from t10 to t12 is made to coincide with the period of the signal f. Namely, if the signal f is formed of a sine wave having a frequency of 50 Hz, then the interval from time t10 to t12 represents 20 milliseconds, which constitute the aforesaid prescribed pulse width of the signal e.

The MMV 34 triggered at the falling edge of the signal e produces a gate signal g (FIG. 2G) having a prescribed pulse width. This gate signal g is conducted to a cue signal generator 36 and an analog gate 38. The cue signal generator 36 issues a signal h (FIG. 2H) having a second frequency f2. This cue signal generator 36 may also be formed of a conventional CR oscillator. The second frequency f2 is defined by a cue pattern-designation data supplied from a cue signal pattern designator 39. The designator 39 may be formed of, for example, a multicontract rotary switch, or an electronic switch comprising a ten-key board and a number of latch circuits corresponding to ten keys. The second frequency f2 is given by a sine wave having a frequency of, for example, 25 Hz. The analog gate 38 is left open to allow for the passage of the signal h, while the gate signal g has a logic level "1", that is, for an interval from t12 to t14. In this embodiment, the interval from t12 to t14 is made to coincide with the period of the signal h. If the signal h is a sine wave having a frequency of 25 Hz, then the interval from t12 to t14 represents 40 milliseconds, which constitutes a prescribed pulse width of the gate signal g.

Figure 2I:
Figure 2J:

The signal f passing through the gate 32 and the signal h conducted through the gate 38 are synthesized to provide a composite signal i as shown in FIG. 2I. This composite signal i is carried to an analog gate 40. This analog gate 40 is opened or closed in accordance with the logic level of a gate signal j. The MMV 16 is triggered at the falling edge of the signal a, issuing the gate signal j (FIG. 2J) having a prescribed pulse width. The analog gate 40 is left open to allow for the passage of the signal i, while the signal j has a logic level "1", that is, for an interval from t10 to t14. The signal i passing through the gate 40 is synthesized with the output from the adder 24, providing the composite signal k (FIG. 2K) to be recorded. (FIG. 2K illustrates a waveform free from a bias signal delivered from the bias oscillator 26.)

Figure 2K:

Referring to FIG. 2K, the first frequency f1 of 50 Hz continued from t10 to t12 denotes a tape speed pattern. The second frequency f2 of 25 Hz continued from t12 to t14 represents a particular cue signal pattern. A composite cue signal composed of the tape speed pattern signal and cue pattern signal is recorded in the same track of a magnetic tape 42 as that in which the voice signal c is recorded. It is preferred that the cue signal be recorded at the magnetic saturation level of the tape 42. At the time of detection, the cue signal recorded in the tape 42, together with a voice signal, is played out by a detection head (playback head) 44 in the form of an electrical signal l, and supplied to a detecting section 200.

With the foregoing embodiment, a sum of the pulse widths of the signals e and g is made to coincide with the pulse width of the signal b2. The pulse width of the signal e is made to coincide with the period of the signal f1. The pulse width of the signal g is made to conform to the period of the signal h. Further, the pulse width of the signal j is made equal to that of the signal b2. However, the above-mentioned coincidence between the pulse widths of the signals b2, e, g, j and the frequencies of the signals f, h are not absolute requisite conditions for this invention. Such arrangement is merely derived from the assumption of a simple model for better understanding of the invention. The point is that a composite cue signal formed of a tape speed pattern signal and cue pattern signal be included in the signal k to be recorded.

Figure 3:
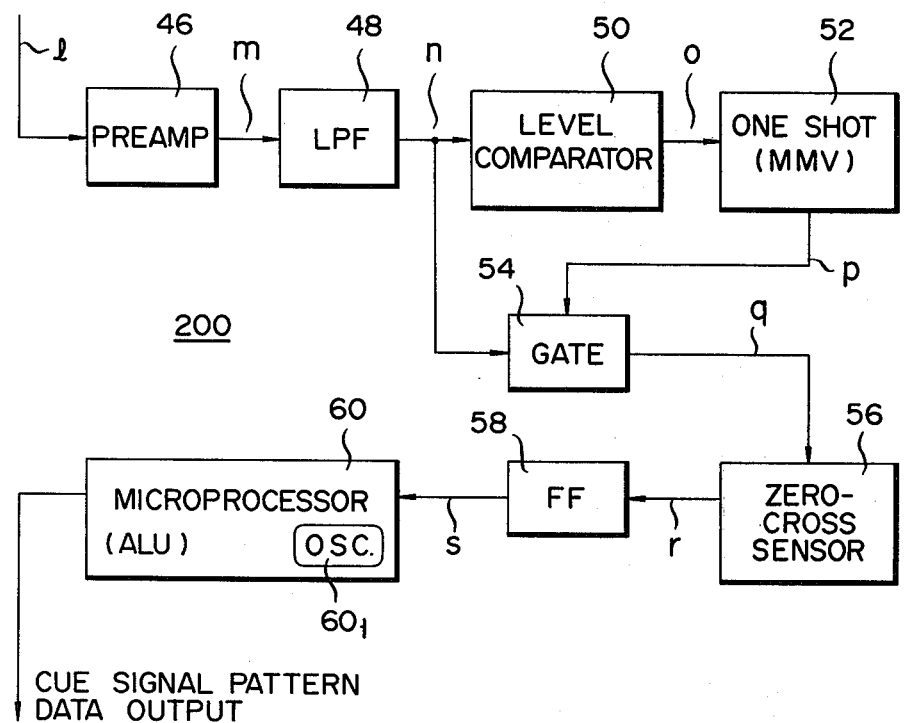
FIG. 3 is a block circuit diagram of a detecting section of said apparatus.
Figure 4:
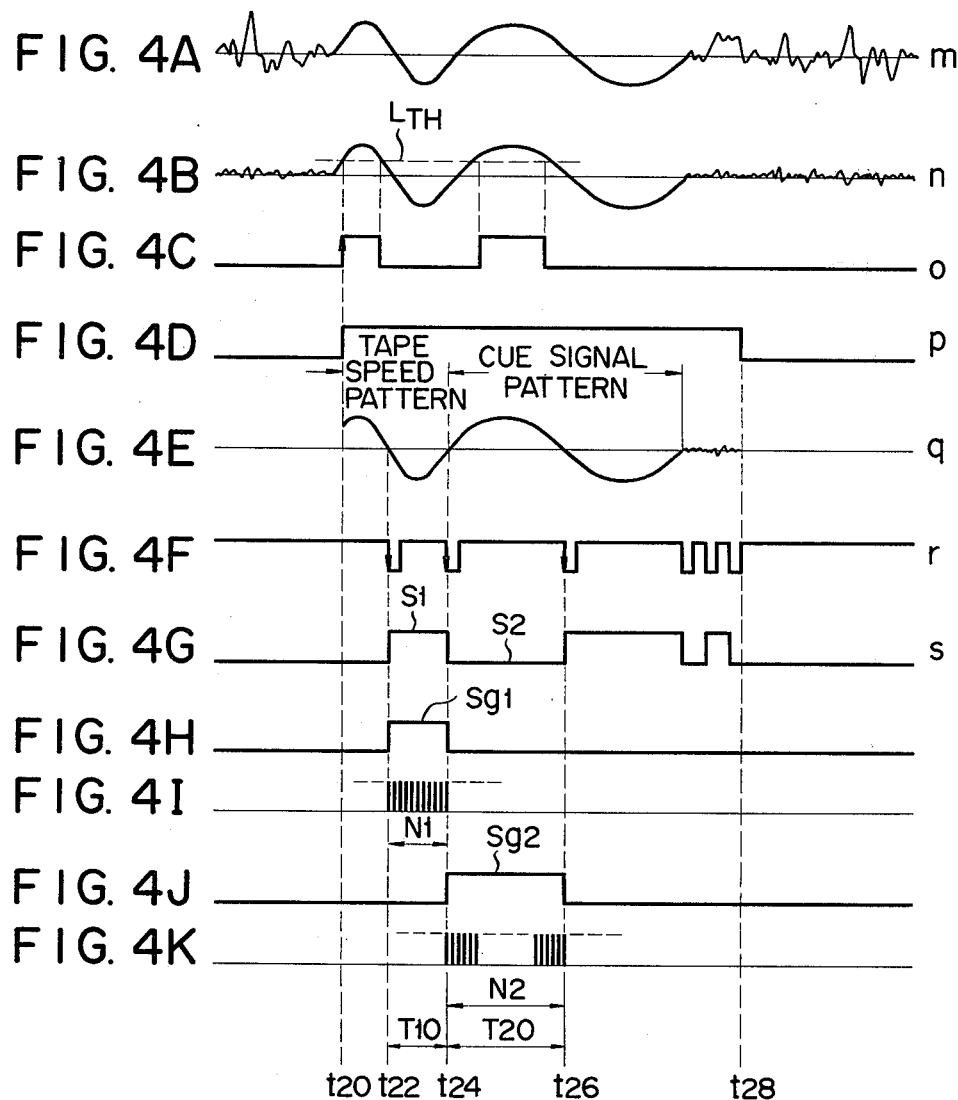
FIGS. 4A–4K are waveform and timing diagrams showing the operation of the detecting section of FIG. 3.

Description is now given of FIG. 3 in which the arrangement of the detecting section 200 of an apparatus embodying this invention is illustrated. FIGS. 4A–4K are waveform and timing diagrams showing the operation of the main part of the detecting section. The signal l drawn out by the detecting head 44 is amplified to a proper extent by a preamplifier 46. When supplied with the signal l containing the aforesaid cue signal, the preamplifier 46 sends forth a signal m shown in FIG. 4A. This signal m is conducted to a low pass filter 48 to have its cue signal component effectively drawn out.

With a dictation recorder, main voice signal levels to be recorded have a frequency distributed roughly over 200 Hz to an audible range. A cue signal recorded in the dictation recorder generally has a lower frequency than 100 Hz. Now let it be assumed that at the time of recording, a cue signal has a maximum frequency of 50 Hz, and that at the detection of the cue signal, a tape runs at a speed 2 to 4 times higher than that which takes place at the time of recording. Then, a cue signal detected from the aforesaid signal m has a maximum frequency of 100 to 200 Hz, and main voice signals have a minimum frequency of 400 to 800 Hz. If, in this case, the low pass filter 48 is formed of a type having a cutoff frequency of 200 to 300 Hz and a relatively sharp slope frequency characteristic, then it is possible to obtain a voice signal n having a relatively low level as shown in FIG. 4B. A phase shift caused by the low pass filter 48 which actually occurs between the signals of FIGS. 4A and 4B is disregarded for convenience of drawing.

The signal n is supplied to a level comparator 50, which compares the level of the signal n with that of a threshold level $L_{TH}$ fully higher than the level of a voice signal included in the signal n and yet lower than the peak level of the cue signal. Where the cue signal has a higher level than the threshold level $L_{TH}$, then the level comparator 50 generates a trigger signal o shown in FIG. 4C. This trigger signal o is conducted to a one shot multivibrator (MMV) 52, which in turn is triggered at the rising or leading edge of the signal o to produce a gate signal p (FIG. 4D) having a prescribed pulse width represented by an interval between t20 and t28 given in FIG. 4.

Now let it be assumed that the cue signal has a time width of, for example, 60 milliseconds, and that at the detection of the cue signal, a tape runs at a speed 2 to 4 times higher than that which occurs at the time of recording. Then, the cue signal has a time width of 30 to 15 milliseconds at the time of detection. In other words, the time width of the cue signal is in inverse proportion to the running speed of the tape at the time of detection. For the aforesaid embodiment, the signal p well serves the purpose if it has a time width of 40 to 50 milliseconds. Where the signal p has too short a pulse width, then it is impossible to read out the whole of a detected cue signal.

The signal p is supplied as a gate signal to an analog gate 54. This analog gate 54 is already supplied with the signal n, and is opened when the incoming signal p has a logic level "1". The signal n supplied to the analog gate 54 while it is left open, that is, during an interval between t20 and t28, is sent forth from the gate 54 in the form of a signal q (FIG. 4E). This signal q contains the latter half section of the tape speed pattern included in the composite cue signal and the former half section of the cue signal pattern. The signal q is delivered to a zero cross sensor 56, which generates a signal r (FIG. 4F) containing a pulse which falls at points of time t22, t24, t26 when the signal q crosses the zero level. The signal r is supplied to a flip-flop circuit 58, which in turn is triggered at the falling edge of the signal r. As a result, the signal r is converted into a signal s (FIG. 4G) which is obtained by halving the frequency of the signal r. The signal s is conducted to the conventional microprocessor or arithmetic logic unit 60. Hereinafter, description is only given of the microprocessor. The microprocessor 60 detects the running speed of a tape when the signal l is detected in a timing in which the signal s has its level changed, and calculates a cue signal pattern compensated by the result of this detection. The microprocessor 60 may be replaced by an apparatus disclosed in U.S. Pat. No. 3,803,390 (Inventor: Ellert).

When supplied with the signal s, the microprocessor 60 generates a gate signal sg1 corresponding to the high level section s1 of the incoming signal s for an interval from t22 to t24 shown in FIGS. 4G and 4H. The microprocessor 60 contains a clock signal oscillator $60_1$. A number N1 of clock signals issued from the clock signal oscillator $60_1$ is counted with the signal sg1 used as a gate signal. Now let it be assumed that the clock signal oscillator $60_1$ has an oscillation frequency of 100 KHz and pulses (FIG. 4I) counted with the signal sg1 used as a gate signal has a number N1 of 400. Then, the pulse width of the gate signal sg1, namely, half the period of a signal denoting a tape speed pattern is 400/100 KHz=4 ms.

Where a signal denoting a tape speed pattern at the time of recording a cue signal has a frequency of 50 Hz, and a tape speed at the time of detecting a cue signal is equal to the tape speed at the time of said recording, then the gate signal sg1 should have a pulse width of 10 milliseconds. In the above-mentioned case, however, the gate signal sg1 has a pulse width of 4 milliseconds. This means that a tape speed at the time of detecting a cue signal is 10 ms/4 ms, that is, 2.5 times higher than at the time of recording a cue signal. If a tape speed at the time of recording a cue signal stands at 2.4 cm/s, then a tape speed at the time of detecting the cue signal is 2.4×2.5=6.0 cm/s.

Where the detection of a tape speed is brought to an end, then the microprocessor 60 generates a gate signal sg2 corresponding to a low level section s2 immediately following the high level section s1 for an interval from t24 to t26 shown in FIGS. 4G and 4J. Now let it be assumed that pulses from the clock signal oscillator (having a frequency of 100 KHz) counted with the signal sg2 used as a gate signal has a number N2 of 800. Then the pulse width of the gate signal sg2, that is, half the period of a signal denoting a detected cue signal pattern is 800/100 KHz=8 ms. An A.C. signal whose half period shows 8 milliseconds has a frequency of 62.5 Hz. In other words, a signal denoting a cue signal pattern detected without compensation has a frequency of 62.5 Hz.

Further, it is already determined from a number N1=400 counted during an interval from t22 to t24 that a tape speed at the time of detecting a cue signal is 2.5 times higher than at the time of recording a cue signal. Therefore, the 62.5 Hz frequency of a cue pattern signal obtained without compensation is compensated in the microprocessor 60 by a tape speed data "2.5". In other words, the microprocessor 60 carries out a division "62.5÷2.5". As a result, a compensated signal denoting a cue signal pattern has a frequency of 62.5 Hz/2.5=25 Hz. A data of 25 Hz thus obtained on a signal denoting a detected cue signal pattern is coded into a proper form and sent forth in such form from the microprocessor 60.

Now let it be assumed that a half period of a signal denoting a detected tape speed pattern is represented by T10, and a half period of a signal showing a detected cue signal pattern is expressed as T20. Then the following equation results.

$$T20 = \frac{N2}{N1} T10 \qquad (1)$$

The numerals N1, N2 denote counts actually detected by the microprocessor 60. Where, therefore, the microprocessor 60 is supplied with a signal s (FIG. 4G), then the ratio (N2/N1) given in the above equation (1) can be determined.

Now let it be assumed that T1 indicates a half period of a signal denoting a tape speed pattern at the time of recording a cue signal; T2 represents a half period of a signal showing a cue signal pattern; and $\alpha$ expresses the ratio which an increased tape speed at the time of detecting a cue signal bears to that which occurs at the time of recording a cue signal. Then, the following relation results.

$$\left. \begin{array}{l} T10 = T1/\alpha \\ T20 = T2/\alpha \end{array} \right\} \qquad (2)$$

In the previously described case, $\alpha=2.5$ and T1=10 ms (half period of a signal having a frequency of 50 Hz). Therefore, there results T10=4 ms. Thus, the following equation is derived from the equations (1) and (2) above.

$$\frac{T2}{\alpha} = \frac{N2}{N1} \frac{T1}{\alpha} \qquad (3)$$

Since both sides of the equation (3) above include the ratio α between the aforesaid two tape speeds, the equation (3) may be rewritten as follows:

$$T2 = \frac{N2}{N1} T1 \quad (4)$$

T1 and T2 given in the equation (4) above are values determined only by outputs from the tape speed generator 30 and the generator 36 of a signal denoting a cue signal pattern regardless of a tape speed. As seen from the equation (4) above, therefore, the count ratio N2/N1 calculated by the microprocessor 60 does not have any relationship with a tape speed. T1 is a known data. T2 corresponding to a signal denoting a recorded cue signal pattern can be determined from the data T1 and the count ratio N2/N1 measured in accordance with the signal s. Further, since T1 is a known fixed data, the count ratio N2/N1 itself may be taken as a data corresponding to a cue signal pattern. In other words, the determination of the count ratio N2/N1 can distinguish between the forms or kinds of cue signals.

Now the case is considered where a first frequency f1 of 50 Hz is taken to represent a tape speed pattern, and second frequencies of 20 Hz and 25 Hz are used to denote a cue signal pattern. These two second frequencies are determined by a cue signal pattern-designation data supplied from the cue signal pattern designator 39 to the generator 36 of a signal denoting a cue signal pattern. If the generator 36 is a CR oscillator, then the time constant of the oscillation circuit is changed by the cue signal pattern designation data. When a first composite cue signal formed of a 50 Hz tape speed pattern signal and a 20 Hz signal denoting a cue signal pattern is supplied to the cue signal detecting section 200, then the ratio N2/N1=2.5 results, regardless of a tape speed. Assuming in the equation (2) T1=10 ms (50 Hz), T2=25 ms (20 Hz) with the ratio α taken to have an optional value, then there results T10=10/α ms and T20=25/α ms. If a clock signal used in the microprocessor 60 has a frequency of 100 KHz, then a count N1 obtained during a gate period of T10 indicates N1=10/α×100=1000/α. A count N2 measured during a gate period of T20 shows N2=25/α×100=2500/α. Thus, the ratio N2/N1=2.5 results.

When the cue signal-detecting section 200 is supplied with a second cue signal including a tape speed pattern of 50 Hz and a cue signal pattern of 25 Hz, then the ratio N2/N1=2.0 is indicated regardless of a tape speed. Where an output data on a cue signal pattern is produced which shows the ratio N2/N1=2.0, then it is seen that a detected cue signal represents the second cue signal. Where an output data in a cue signal pattern is obtained which indicates the ratio N2/N1=2.5, then a detected cue signal is found to be the first cue signal.

As is apparent from the foregoing description, an apparatus of FIGS. 1 and 3 for recording and detecting a cue signal can distinguish between various forms of cue signals regardless of a tape speed without providing an exclusive track on a tape for the recording of a cue signal. Thus, the contents of only a desired data can be drawn out by means of a detected cue signal. Now let it be assumed that a first cue signal pattern is impressed ahead of the starting point of a record of, for example, Mr. A's speech. Then, a tape recorder mechanism is automatically brought to rest by means of an output data on the first cue signal pattern. Therefore, a quick search can be made for Mr. A's speech alone. Where a second cue signal pattern is similarly set ahead of the starting point of a record of, for example, Mr. B's speech, then it is possible to quickly search for Mr. B's speech alone.

Figure 5:
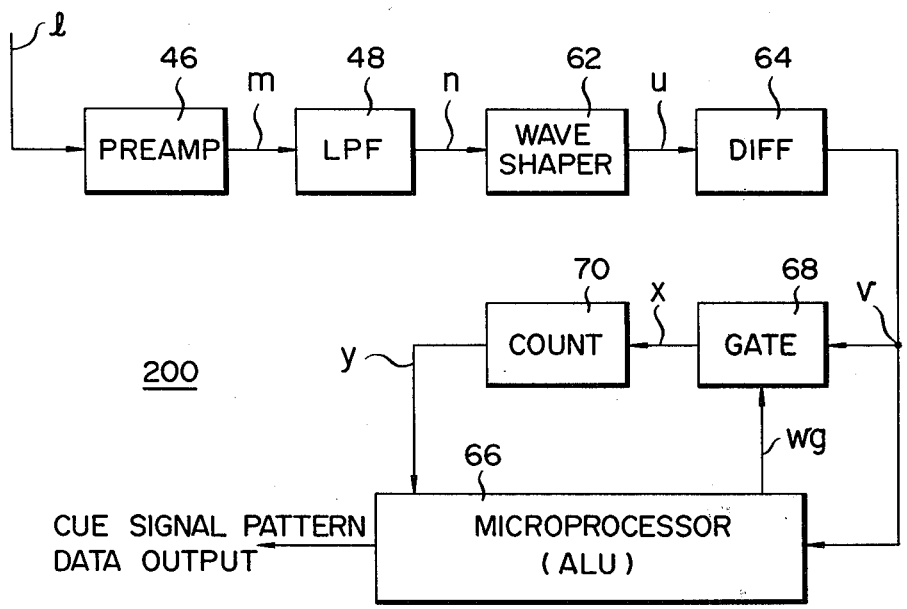
FIG. 5 is a block circuit diagram of a modification of the detecting section of FIG. 3.

FIG. 5 is a block circuit diagram of a modification of the cue signal-detecting section 200 of FIG. 3. FIGS. 6A-6E are waveform and timing diagrams showing the waveforms of signals produced in the main part of the cue signal-detecting section.

Description is now given of the case where a cue signal and a voice signal are superposed on each other at the same time as shown in FIGS. 6A and 6B. It will be noted, however, that said simultaneous superposition of the cue signal and voice signal gives rise to no difficulties. A signal n delivered from a low pass filter (abbreviated as LPF) 48 is supplied to the wave-shaper 62 such as a Schmidt circuit. A signal for triggering this wave-shaper 62 has a higher level than the peak level of a voice signal component attenuated by the LPF 48. A signal u whose waveform has been shaped by the wave-shaper 62 only corresponds to a cue signal as shown in FIG. 6C. The signal u is differentiated by a differentiator 64 and converted into a pulse signal v shown in FIG. 6D. This signal v is conducted to a microprocessor or arithmetic logic unit 66. (Hereinafter, description is only given of the microprocessor.) This microprocessor 66 detects a pulse width T30 corresponding to one period of a tape speed pattern signal shown in FIG. 6E. This detection is carried out based on two positive pulses v1 and v2 (FIG. 6D) at the time of t30 and t32, or at the time of the initial one period of the signal v. Upon completion of the detection, a gate signal wg having a logic level "1" is generated for an interval extending from a point of time t34 at which a third positive pulse v3 is sent forth to a point of time t36 delayed from t34 by a prescribed length of time T40. This prescribed length of time T40 is defined by a pulse width T30 detected with respect to the signal v. In a simple instance, T30 is equal to T40. The gate signal wg thus detected is supplied to a gate circuit 68.

This gate circuit 68 is previously supplied with the signal v. The gate circuit 68 is left open by the gate signal wg having a logic level "1" for an interval from t34 to t36. Among the pulse signals v received, the pulse signals v3, v4, v5 pass through the gate circuit 68, and are conducted as clock signals x to a counter 70, which counts a number (in this case, 3) of pulses of the clock signals. The result y of said counting is delivered to the microprocessor 66. A data on a cue signal pattern is produced from the microprocessor 66. The period T40 during which the gate circuit 68 is to be opened varies with the pulse width T30 corresponding to a detected tape speed pattern. Therefore, a count made by the counter 70 varies with a detected pattern signal independently of a tape speed.

Although specific constructions have been illustrated and described herein, it is not intended that the invention be limited to the elements and constructions disclosed. One skilled in the art will recognize that other particular elements or sub-constructions may be used without departing from the scope and spirit of the invention.

Further, signals denoting the tape speed pattern and cue signal pattern may have other waveforms than the sine type. A signal denoting a cue signal pattern included in a composite cue signal may be formed of components having different frequencies. If, in this case, a composite cue signal comprises components having different frequencies specific to each cue signal, then each cue signal can be distinguished regardless of a tape speed.

The microprocessor 60 and/or 66 may be formed of, for example, the single component microcomputer model 8048/8748 of the Intel Co., U.S.A. or the arithmetic logic unit model DM 54181/DM 74181 of the National Semiconductor Co., U.S.A.

What is claimed is:

1. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, data on said first specified data pattern being supplied and recorded before the data on said second specified data pattern; and detecting means for detecting a cue signal data pattern reproduced from said recording medium, said cue signal data pattern including signals corresponding to said first and second specified data patterns, said detecting means including means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced.

2. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said recording means including: first means for supplying a signal having a first frequency as data on said first specified data pattern; and second means for supplying a signal having a second frequency as data on said second specified data pattern; and detecting means for detecting a cue signal data pattern reproduced from said recording medium, said cue signal data pattern including first and second detected data corresponding respectively to said first and second specified data patterns, said detecting means including arithmetic operation means for arithmetically calculating the ratio between the first detected data corresponding to the first period of the data on said first specified data pattern and the second detected data corresponding to the second period of the data on said second specified data pattern; means for multiplying said ratio by a value which is a function of said first detected data to produce a multiplied ratio; and means responsive to multiplied ratio for calculating data on said cue signal pattern and compensating the contents of said second specified data pattern in accordance with said multiplied ratio and the contents of said first specified data pattern, and for thereby producing a signal corresponding to said original recorded composite cue signal when said composite cue signal is reproduced.

3. The apparatus according to claim 2, wherein said detecting means includes pulse-generating means; said first detected data corresponding to a first number of pulses issued from said pulse-generating means during a first period which is proportional to the period of the data on said first specified data pattern; and said second detected data corresponding to a second number of pulses issued from said pulse-generating means during a second period which is proportional to the period of the data on said second specified data pattern.

4. The apparatus according to claim 2, wherein said first frequency is a single frequency; said second frequency includes a plurality of second frequencies; and said second means generates a signal having a given second frequency selected from among the plurality of second frequencies.

5. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said recording means including: first means for supplying a signal having a first frequency as data on said first specified data pattern; and second means for supplying a signal having a second frequency as data on said second specified data pattern; and detecting means for detecting a cue signal data pattern reproduced from said recording medium, said cue signal data pattern including first and second detected data corresponding respectively to said first and second specified data patterns, said detecting means including arithmetic operation means for arithmetically calculating the ratio between the first detected data corresponding to the first period of the data on said first specified data pattern and the second detected data corresponding to the second period of the data on said second specified data pattern; and means responsive to the calculated ratio for compensating the contents of said second specified data pattern in accordance with the contents of said first specified data pattern to thereby produce a signal corresponding to said original recorded composite cue signal when said composite cue signal is reproduced;

said detecting means further including pulse-generating means; said first detected data corresponding to a first number of pulses issued from said pulse-generating means during a first period which is proportional to the period of the data on said first specified data pattern; and said second detected data corresponding to a second number of pulses issued from said pulse-generating means during a second period which is proportional to the period of the data on said second specified data pattern.

6. The apparatus according to claim 3 or 5, wherein said first frequency is a single frequency; said second frequency includes a plurality of second frequencies; and said second means generates a signal having a given second frequency selected from among the plurality of second frequencies.

7. The apparatus according to any one of claims 2, 3, 4, 5 or 9, wherein the data on said first specified data pattern is supplied before the data on said second specified data pattern.

8. The apparatus according to claim 6, wherein the data on said first specified data pattern is supplied before the data on said second specified data pattern.

9. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said recording means including: first means for supplying a signal having a first single frequency as data on said first specified data pattern; and second means for supplying a signal having a given second frequency selected from among a plurality of second frequencies; as data on said second specified data pattern;
and detecting means for detecting a cue signal data pattern reproduced from said recording medium, said cue signal data pattern including first and second detected data corresponding respectively to said first and second specified data patterns, said detecting means including arithmetic operation means for arithmetically calculating the ratio between the first detected data corresponding to the first period of the data on said first specified data pattern and the second detected data corresponding to the second period of the data on said second specified data pattern; and means responsive to the calculated ratio for compensating the contents of said second specified data pattern in accordance with the contents of said first specified data pattern to thereby produce a signal corresponding to said original recorded composite cue signal when said composite cue signal is reproduced.

10. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said recording means including: first means for supplying a signal having a first frequency as data on said first specified data pattern; and second means for supplying a signal having a second frequency as data on said second specified data pattern, the data on said first specified data pattern being supplied before the data on said second specified data pattern; and detecting means for detecting a cue signal data pattern reproduced from said recording medium, said cue signal data pattern including first and second detected data corresponding respectively to said first and second specified data patterns, said detecting means including arithmetic operation means for arithmetically calculating the ratio between the first detected data corresponding to the first period of the data on said first specified data pattern and the second detected data corresponding to the second period of the data on said second specified data pattern; and means responsive to the calculated ratio for compensating the contents of said second specified data pattern in accordance with the contents of said first specified data pattern to thereby produce a signal corresponding to said original recorded composite cue signal when said composite cue signal is reproduced;

said detecting means further including pulse-generating means; said first detected data corresponding to a first number of pulses issued from said pulse-generating means during a first period which is proportional to the period of the data on said first specified data pattern; and said second detected data corresponding to a second number of pulses issued from said pulse-generating means during a second period which is proportional to the period of the data on said second specified data pattern.

11. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said first specified data pattern comprising at least one cycle of a signal having a first frequency, and said second specified data pattern comprising at least one cycle of a signal having a second frequency different from said first frequency; and detecting means for detecting a cue signal data pattern reproduced from said recording medium, said cue signal data pattern including data signals corresponding to said first and second specified data patterns, said detecting means generating the data signals corresponding to said first specified data pattern before the data signal corresponding to said second specified data pattern, said detecting means including means responsive to the detected data signal corresponding to said first data pattern for compensating the contents of said second specified data pattern in accordance with the contents of said first specified data pattern to thereby produce a signal corresponding to said original recorded composite cue signal when said composite cue signal is reproduced.

12. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said first specified data pattern comprising at least one cycle of a signal having a first frequency, and said second specified data pattern comprising at least one cycle of a signal having a second frequency different from said first frequency, said recording means including: first means for supplying said signal having said first frequency as data on said first specified data pattern; and second means for supplying said signal having said second frequency as data on said second specified data pattern; and detecting means for detecting a cue signal data pattern reproduced from said recording medium, said cue signal data pattern including signals corresponding to said first and second specified data patterns, said detecting means including means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced.

13. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern having at least a first period of data and a second specified data pattern having at least a second period of data, said second specified data pattern occurring in time after said first specified data pattern, said first specified data pattern comprising at least one cycle of a signal having a first frequency, and said second specified data pattern comprising at least one cycle of a signal having a second frequency different from said first frequency; and detecting means for detecting a cue signal data pattern reproduced from said recording medium, said cue signal data pattern including first and second detected data corresponding respectively to said first and second specified data patterns, said detecting means including arithmetic operation means for arithmetically calculating the ratio between the first detected data corresponding to the first period of the data on said first specified data pattern and the second detected data corresponding to the second period of the data on said second specified data pattern; and means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced.

14. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said first specified data pattern comprising at least one cycle of a signal having a first frequency, and said second specified data pattern comprising at least one cycle of a signal having a second frequency different from said first frequency; and detecting means for detecting a cue signal data pattern reproduced from said recording medium, said cue signal data pattern including signal corresponding to said first and second specified data patterns, said detecting means including means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced.

15. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern, said first specified data pattern comprising at least one cycle of a signal having a first frequency, and said second specified data pattern comprising at least one cycle of a signal having a second frequency different from said first frequency, said recording means including: first means for supplying said signal having said first frequency as data on said first specified data pattern; and second means for supplying said signal having said second frequency as data on said second specified data pattern; and detecting means for detecting a cue signal data pattern reproduced from said recording medium, said cue signal data pattern including first and second detected data corresponding respectively to said first and second specified data patterns, said detecting means including arithmetic operation means for arithmetically calculating the ratio between the first detected data corresponding to the first period of the data on said first specified data pattern and the second detected data corresponding to the second period of the data on said second specified data pattern; and means responsive to the calculated ratio of compensating the contents of said second specified data pattern in accordance with the contents of said first specified data pattern to thereby produce a signal corresponding to said original recorded composite cue signal when said composite cue signal is reproduced.

16. The apparatus according to any one of claims 11, 12, 13, 14 or 15, wherein said first specified data patern comprises a tape speed pattern, said second specified data pattern comprises a cue signal pattern.

17. In a data recording and playback apparatus wherein data is recorded in a recording medium and selectively played back, apparatus for recording and detecting a cue signal comprising:

recording means for recording a composite cue signal in the recording medium of the recording and playback apparatus, said composite cue signal including a first specified data pattern and a second specified data pattern which occurs in time after said first specified data pattern; and detecting means for detecting a cue signal data pattern reproduced from said recording medium, said cue signal data pattern including signals corresponding to said first and second specified data patterns, said detecting means including means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced;
said detecting means further comprising:
means (48,50) for separating said composite cue signal from audio information signals recorded on said recording medium;
a timer (52) coupled to said separating means and responsive to said composite cue signal for generating a gating signal (p) of predetermined time interval longer than the possible time interval of said composite cue signal at a given relative speed of movement of said recording medium;
gating means (54) for receiving a signal including at least a portion of the audio information signal and substantially the complete composite cue signal superposed thereon, and being responsive to the output of said timer (52) for passing substantially only a major portion of said composite cue signal during the time interval of said timer (52);
means (56,58) responsive to the output of said gating means (54) for generating a two composite digital signal, said two components each respectively being a function of said first and second specified data patterns of said composite cue signal; and
means (60) responsive to said first component of said digital signal for determining a quantity which is a function of said first specified data pattern of said composite cue signal, and for compensating said second component of said digital signal to develop a cue signal pattern portion of said composite cue signal as a function of the determined quantity corresponding to said first specified data pattern, thereby distinguishing different cue signal data patterns from each other.

18. The apparatus according to claim 17 wherein said separating means comprises a low pass filter for filtering said composite cue signal from audio information signals, said composite cue signal being of lower frequency than said audio information signals; and a level comparator (50) responsive to the output of said lowpass filter for generating signals which are a function of said separated composite cue signal, said timer (52) being responsive to the output of said level comparator for generator said gating signal (p).

19. The apparatus of claim 17 or claim 18 wherein said means (60) comprises microprocessor means for determining a number which is a function of the time period of said first component of said digital signal, and for compensating said second component of said digital signal as a function of said determined number.

20. In a data recording and playback apparatus wherein data is recorded in a recording medium and selectively played back, apparatus for recording and detecting a cue signal comprising:
recording means for recording a composite cue signal in the recording medium of the recording and playback apparatus, said composite cue signal including a first specified data pattern and a second specified data pattern which occurs in time after said first specified data pattern; and
detecting means for detecting a cue signal data pattern reproduced from said recording medium, said cue signal data pattern including signals corresponding to said first and second specified data patterns, said detecting means including means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced;
said detecting means further comprising:
means (48) for separating said composite cue signal from audio information signals recorded on said recording medium;
wave-shaping means (62) coupled to said separating means for generating a wave-shaped signal corresponding to said composite cue signal, said wave-shaped signal having two components, one component corresponding to said first specified data pattern of said composite cue signal and a second component corresponding to said second specified data pattern of said composite cue signal;
means (68, 70,66) responsive to said components of said wave-shaped signal for determining a quantity which is a function of the period of said first component, said quantity being a function of said first specified data pattern of said composite cue signal, and for compensating said second component of said wave-shaped signal to develop a cue signal pattern portion of said composite cue signal as a function of the determined quantity, thereby distinguishing different cue signal data patterns from each other.

21. The apparatus according to claim 20 wherein said separating means (48) comprises a lowpass filter for filtering said composite cue signal from audio information signals, said composite cue signal being of lower frequency than said audio information signals.

22. The apparatus according to claim 20 or claim 21 wherein said means (68,70,66) comprises a microprocessor (66) coupled to said wave-shaping means via a differentiating circuit (64); a gate (68) coupled to the output of said differentiating circuit and being responsive to gating signals generated by said microprocessor; and a counter (70) for counting the time period of said first component, said microprocessor being responsive to said counter for compensating said second component of said wave-shaped signal to develop said cue signal pattern portion of said composite cue signal.

23. The apparatus of claim 17 or claim 20 wherein said first and second specified data patterns comprise respective signals of first and second different frequencies, said first frequency being greater than said second frequency.

24. In a data recording and playback apparatus wherein data is recorded in a recording medium and selectively played back, apparatus for recording and detecting a cue signal comprising:
recording means for recording a composite cue signal in the recording medium of the recording and playback apparatus, said composite cue signal including a first specified data pattern and a second specified data pattern which occurs in time after said first specified data pattern; and
detecting means for detecting a cue signal data pattern reproduced from said recording medium, said cue signal data pattern including signals corresponding to said first and second specified data patterns, said detecting means including means responsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced;
said recording means comprising:
at least first through fourth timer means (14,34,16,12) for generating gate signals of predetermined time intervals;
first means (30) for supplying a first signal (f) having a first frequency ($f_1$) corresponding to data on said first specified data pattern;
second means (36) for supplying a second signal (h) having a second frequency ($f_2$) corresponding to data on said second specified data pattern;
a first gate (32) responsive to the gate signal of one of said timer means (14) for gating said first signal (f) for a predetermined period of time to an output terminal;
a second gate (38) responsive to the gate signal of a second said timer means (34) for gating said second signal (h) to said output terminal subsequent to the gating of said first signal to said output terminal, said first and second signals, which occur at different timing, being combined to form a composite signal at said output terminal;
a third gate (40) responsive to the gate signal from the third of said timer means (16) for gating said composite signal to a recording element (28) for recording onto said recording medium; and
a fourth gate (20) for normally gating an audio information signal to said recording element, and for blocking said audio information signal during the time said third gate (40) gates said composite signal to said recording element, said third and fourth gates generating their gate signals at substantially the same time for substantially the same time intervals;
whereby said signals of said first and second frequencies are successively recorded onto said recording medium during a gap in the recording of said audio information signal onto said recording medium during the gating times of said third and fourth gates.

25. The apparatus according to claim 24 wherein said gate signals of said first and second timers occur successively in time, the sum of the time intervals of the gate signals of said first and second timers being substantially equal to the intervals of said gate signals from each of said third and fourth timers.

26. The apparatus of claim 24 or 25 wherein said first and second frequency signals are periodic signals, the time interval of said gate signals of said first gate being substantially equal to one period of said first frequency signal, and the time interval of said gate signal of said second gate being substantially equal to one period of said second frequency signal.

27. The apparatus of claim 24 or 25 wherein said first frequency is a function of the speed of transport of the recording medium relative to said recording device, and said second frequency corresponds to cue pattern-designation data.

28. The apparatus of claim 27 wherein said first and second signals are substantially sine wave signals.

29. In a data recording and playback apparatus wherein data is recorded in a recording medium and selectively played back, apparatus for recording and detecting a cue signal comprising:
recording means for recording a composite cue signal in the recording medium of the recording and playback apparatus, said composite cue signal including a first specified data pattern and a second specified data pattern which occurs in time after said first specified data pattern; and
detecting means for detecting a cue signal data pattern reproduced from said recording medium, said cue signal data pattern including signals corresponding to said first and second specified data patterns, said detecting means including means reponsive to the detected signal corresponding to said first data pattern for compensating the contents of said second specified data pattern in accordance with the contents of said first specified data pattern to thereby produce a signal corresponding to said original recorded composite cue signal when said composite cue signal is reproduced;
said recording means comprising:
at least first through fourth timer means (14,34,16,12) for generating gate signals of predetermined time intervals;
first means (30) for supplying a first signal (f) having a first frequency ($f_1$) corresponding to data on said first specified data pattern;
second means (36) for supplying a second signal (h) having a second frequency ($f_2$) corresponding to data on said second specified data pattern;
a first gate (32) responsive to the gate signal of one of said timer means (14) for gating said first signal (f) for a predetermined period of time to an output terminal;
a second gate (38) responsive to the gate signal of a second said timer means (34) for gating said second signal (h) to said output terminal subsequent to the gating of said first signal to said output terminal, said first and second signals, which occur at different timing, being combined to form a composite signal at said output terminal;
a third gate (40) responsive to the gate signal from the third of said timer means (16) for gating said composite signal to a recording element (28) for recording onto said recording medium; and
means (22,24,26) for coupling an audio information signal to said recording element for recording on said recording medium;
whereby said signals of said first and second frequencies are successively recorded onto said recording medium, and said audio information signal is recorded on said recording medium.

* * * * *